F. W. ROBERTSHAW.
THERMOSTATIC VALVE.
APPLICATION FILED JULY 15, 1909.
998,262.
Patented July 18, 1911.
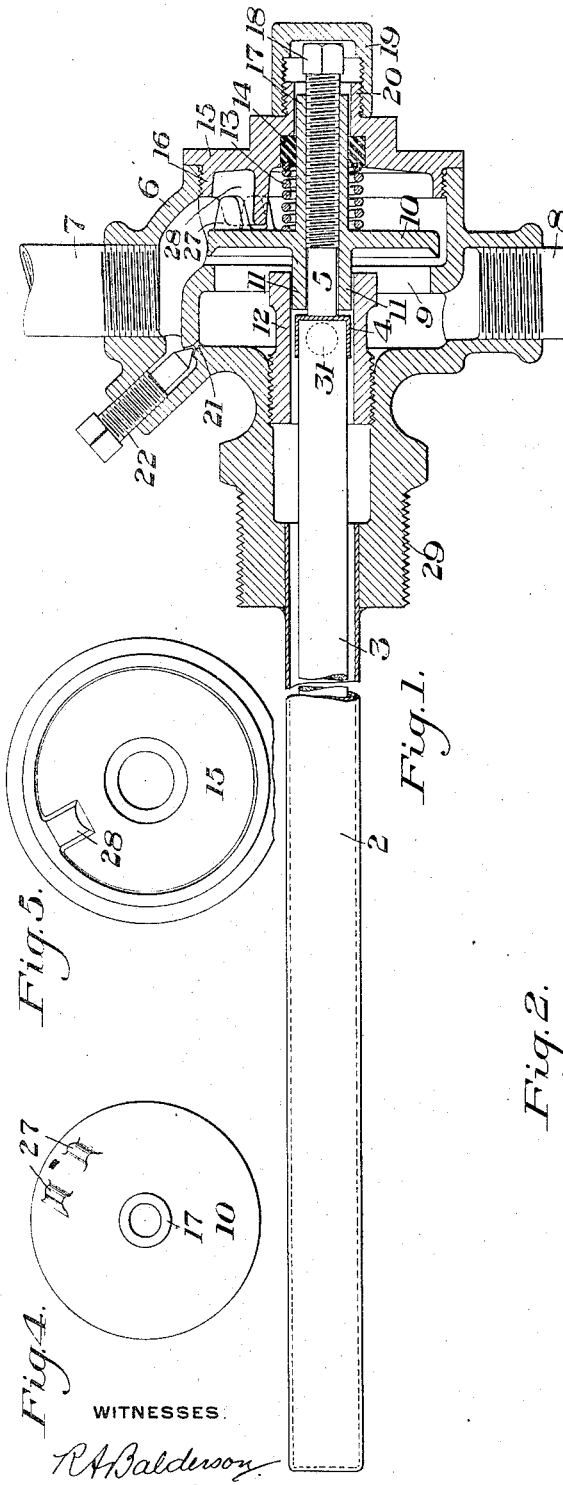
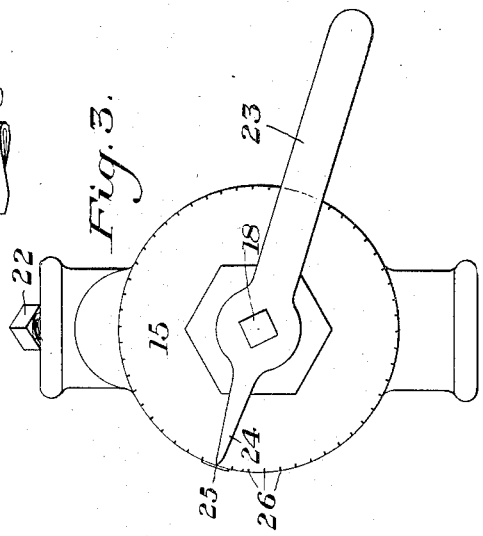
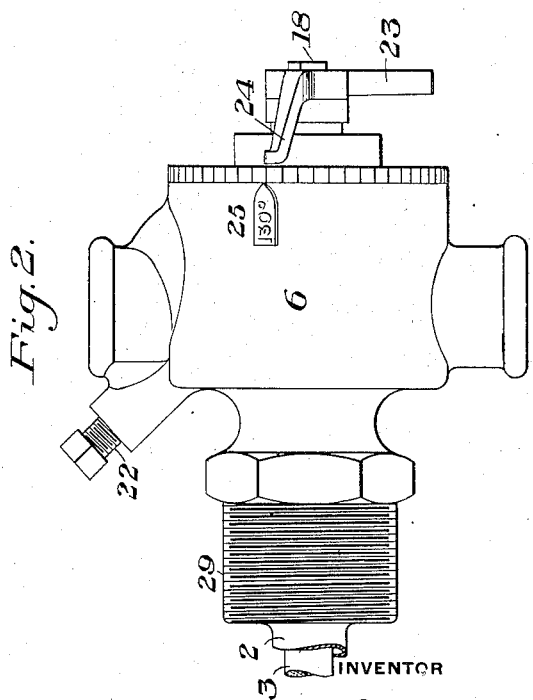
WITNESSES
R A Balderson
G. B. Bluming
INVENTOR
F. W. Robertshaw,
by Bakewell, Byrnes & Parmelee,
his Attys

UNITED STATES PATENT OFFICE.

FREDERICK W. ROBERTSHAW, OF PITTSBURG, PENNSYLVANIA.

THERMOSTATIC VALVE.

998,262.  Specification of Letters Patent.  Patented July 18, 1911.

Application filed July 15, 1909. Serial No. 507,726.

*To all whom it may concern:*

Be it known that I, FREDERICK W. ROBERTSHAW, of Pittsburg, Allegheny county, Pennsylvania, have invented a new and useful Improvement in Thermostatic Valves, of which the following is a full, clear, and exact description, reference being had to the accompanying drawings, forming part of this specification, in which—

Figure 1 is a longitudinal section of a valve embodying my invention; Fig. 2 is a side view of the same; Fig. 3 is an end view; Fig. 4 is a plan view of the valve disk; and Fig. 5 is a plan view of the cap.

My invention has relation to the class of thermostatic valves, and is designed to provide a valve of this type having means of improved character whereby the valve may be set or adjusted to operate at the desired temperature and to make it possible for the user to readily change the valve to give it the desired adjustment without the necessity for disconnecting or removing any of the parts or shutting off the flow of gas through the valve.

The precise nature of my invention will be best understood by reference to the drawings, in which I have shown the preferred form thereof, it being premised, however, that various changes may be made in the detail of construction and arrangement of the parts without departing from the spirit and scope of my invention as defined in the appended claims.

In the drawings, the numeral 2 designates a thermostatic element, consisting of an outer metallic tube and an inner carbon rod arranged in a well known manner, the expansion and contraction of the metallic tube being transmitted to and by the carbon rod to operate the valve. This carbon rod, which is shown at 3 has at its inner end a metallic ferrule or thimble 4 for contact with the adjustable stem 5.

6 designates the valve casing or shell, which is provided with the inlet connection 7 and the outlet connection 8. The inlet and outlet connections communicate with each other through the port 9 controlled by the valve 10. This valve is provided with the inwardly extending hub portion 11, which is guided in the sleeve or bushing 12 screwed into the valve casing, and into which the inner end portion of the carbon rod extends.

13 is a spring normally tending to seat the valve, and which is seated between the outer side of the valve and a seat or bushing 14 carried by the cap 15 which closes the opening in the end of the shell. This cap has a threaded flange 16, which engages the threaded wall of the opening in the shell. The stem 5 is adjustably threaded in a sleeve 17 projecting from the outer face of the valve disk, said sleeve together with the stem extending outwardly through a central opening in the cap, and the stem having at its outer end a head or wrench seat 18. 19 is a cap or guard, which surrounds this head, and which is removably threaded on a projecting boss 20 of the cap. This cap or guard also serves to give additional means for preventing leakage around the stem 5.

21 is a by-pass port, which is adapted to supply sufficient gas to the burner at all times to maintain a slight combustion, independently of the supply controlled by the valve 10. This port 21 is controlled by the adjustable valve 22.

23 is a wrench or lever having a socket adapted to the wrench head 18 and provided with a pointer extension 24. The exterior of the valve casing is provided, preferably at opposite sides with an indicating mark 25, denoting a given temperature. In the manufacture of the valve, the parts are so adjusted that when the pointer extension 24 of the wrench 23 is opposite this indicating mark 25, as shown in Figs. 2 and 3, the thermostat will act to maintain the temperature of the system in which the valve is inserted at the degree indicated. The circumferential edge of the cap 15 is graduated with a series of notches or other marks 26. These marks are so graduated so as to each indicate a difference of say ten degrees of temperature. The user, therefore, by applying the wrench 23, and moving the pointer extension 24 to either side of the indicating mark 25 on the casing, can vary the adjustment of the valve to cause it to operate at either a higher or a lower temperature as may be desired. In order to prevent the valve 10 from rotating with the stem 5 as the latter is adjusted, said valve is provided with the lugs 27, which are engaged by a lug 28 on the interior of the cap, thereby locking the valve disk against rotary movement.

The advantages of the invention will be apparent. The user can adjust the valve to operate at any desired temperature by simply removing the cap or guard 19 and applying the wrench 23, without shutting off the flow of gas from the valve and without disconnecting any of the parts. The stem 5 can also be operated by the wrench to positively close the valve 10 when it is desired to adjust the by-pass valve 22, and the pointer extension 24 in connection with the indicating marks 25 will enable the user to afterward set the valve 10 back in proper adjustment.

My improved valve has been especially designed for use in connection with water-heating systems for controlling the flow of the gas to the burner which supplies heat to the system, the thermostatic element 2 being inserted at some suitable point in the circulating system so as to be affected by the water therein. For this purpose, the valve casing is provided with the threaded coupling 29 adapted to be screwed into the pipe or other element in which the thermostat is inserted. The bushing 12 is also preferably provided with one or more openings 31 so as to equalize the pressure between opposite sides of the valve and to prevent undue accumulation of pressure within said bushing.

What I claim is:—

1. In a thermostatic valve, a thermostatic element, and a valve arranged to be acted upon by said element to unseat the valve, said valve having an adjustable stem projecting exteriorly of the casing, the inner end of said stem forming the point of contact with the thermostatic element, and the outer end of the stem having a wrench or key seat; substantially as described.

2. In a thermostatic valve, a thermostatic element, a valve arranged to be unseated by said element, and a spring acting in opposition to the element, said valve having a stem adjustably seated therein, the inner end of said stem forming the point of contact with the thermostatic element, and the opposite end of the stem projecting exteriorly of the casing and having a wrench or key seat, and a detachable key or wrench adapted to said seat, the said key or wrench and the casing having coöperating indicating portions; substantially as described.

3. In a thermostatic valve, a thermostatic element, a valve member having an adjustable stem for contact with said element, said stem projecting exteriorly of the casing and having at its outer end a wrench or key seat, and a wrench or key adapted to said seat and having a pointer extension, the casing having coöperating indicating marks, said wrench or key being removable and a closure for covering the projecting end of the stem when the wrench or key is removed; substantially as described.

4. In a thermostatic valve, a casing, a thermostatic element, and a valve arranged to be acted upon by the element, said valve having an adjusting member secured thereto and extending to the opposite side of the valve from the thermostatic element, said member having a wrench or key-seating portion, a wrench or key adapted thereto and having an indicating portion, and the casing having indicating marks to coöperate with said indicating portion, said adjusting member being free to move with the valve and providing means for moving the valve toward and away from the thermostatic element, together with means for preventing rotation of the valve, substantially as described.

5. In a thermostatic valve, a valve casing having an opening therein, a screw cap closing said opening and provided with a flange having graduation marks on its periphery, a valve member having an adjustable stem projecting through said cap, and a wrench or key adapted to engage the outer end of the stem and having a pointed extension arranged to coöperate with the graduations of said flange, the casing also having an indicating mark denoting a certain setting of the valve, and the graduations on said flange being made with reference to said mark together with a thermostatic element in operative relation to the valve; substantially as described.

6. In a thermostatic valve, a valve casing having a thermostatic element extending therein from one side, an opening in the opposite side of said casing, a screw cap closing said opening and having a flange provided with graduation marks on its periphery, a valve within the casing, said valve being guided in the screw cap and also having an adjustable stem, one end of which projects through the valve in contact with the thermostatic element, and the other end of which projects through the screw cap exteriorly of the casing and is provided with a wrench seat, together with a wrench having a pointer extension adapted to coöperate in use with the graduation marks on said flange, substantially as described.

7. In a thermostatic valve, a valve casing having a thermostatic element extending therein from one side and having an opening at its opposite side, a screw cap closing said opening, a valve member having a hub or sleeve portion extending to both sides thereof and into the screw cap, a screw adjustably seated in said hub or sleeve portion, the inner end of said screw contacting with the thermostatic element and the outer end of the screw extending through the screw cap and exteriorly of the casing and having means for the application of an actuating tool thereto, together with a spring interposed between the valve and the screw cap and acting in opposition to the thermostatic element, substantially as described.

In testimony whereof, I have hereunto set my hand.

FREDERICK W. ROBERTSHAW

Witnesses:
 H. M. CORWIN,
 GEO. H. PARMELEE.